(12) United States Patent
Shibata (10) Patent No.: US 10,101,593 B2
(45) Date of Patent: Oct. 16, 2018

(54) OPTICAL APPARATUS, CONTROL METHOD THEREOF AND STORAGE MEDIUM

(71) Applicant: CANON KABUSHIKI KAISHA, Tokyo (JP)

(72) Inventor: Masahiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 14/692,039

(22) Filed: Apr. 21, 2015

(65) Prior Publication Data

US 2015/0309329 A1    Oct. 29, 2015

(30) Foreign Application Priority Data

Apr. 23, 2014    (JP) .................................. 2014-089559

(51) Int. Cl.
*G02B 27/64*    (2006.01)
*H04N 5/232*    (2006.01)

(52) U.S. Cl.
CPC ....... *G02B 27/646* (2013.01); *H04N 5/23258* (2013.01)

(58) Field of Classification Search
CPC .......... G02B 15/20; G02B 7/10; G02B 13/18; G02B 27/646; G02B 13/36; G02B 3/14; G02B 7/32; G02B 15/17; G02B 15/161; G02B 15/173; G02B 15/177; G02B 26/005; G02B 26/0883; G03B 5/00; G03B 5/06;

(Continued)

(56) References Cited

U.S. PATENT DOCUMENTS 5,502,484 A * 3/1996 Okada ................ H04N 5/23248
348/208.6
2005/0083584 A1* 4/2005 Ito ........................ G02B 27/646
359/687

(Continued)

FOREIGN PATENT DOCUMENTS

CN    1955782 A    5/2007
JP    2003-202499 A    7/2003
JP    2010-004370 A    1/2010

OTHER PUBLICATIONS

A Jul. 26, 2017 Chinese Office Action, which is enclosed with an English Translation, that issued in Chinese Patent Application No. 201510190480.7.

*Primary Examiner* — Mustak Choudhury
(74) *Attorney, Agent, or Firm* — Cowan, Liebowitz & Latman, P.C.

(57) ABSTRACT

An optical apparatus comprises a shake detection unit, a first optical correction unit, a second optical correction unit, a zoom detection unit, a correction amount calculation unit configured to calculate correction amounts to be corrected by the first optical correction unit and the second optical correction unit, and a control unit configured to change a calculation method of the correction amounts according to whether or not zoom lens performs zoom operation, wherein the control unit controls to calculate the correction amounts by calculation of separating a frequency of the shake when the zoom operation is stopped, and to calculate the correction amounts by proportional calculation based on movable ranges of the first optical correction unit and the second optical correction unit when the zoom operation is performed.

9 Claims, 3 Drawing Sheets

(58) Field of Classification Search
CPC .... G03B 17/14; H04N 5/23258; H04N 5/145; H04N 5/232–5/235; H04N 5/243; H04N 5/347; H04N 5/349; H04N 5/2357; H04N 5/23216; H04N 5/772; H04N 5/23219; H04N 5/23241–5/23248; H04N 5/23254; H04N 5/23261–5/23264; H04N 5/23277; H04N 5/23283; H04N 5/23287; H04N 5/23293–5/23296
USPC .. 359/557, 217.3, 354, 676, 341.44, 341.41, 359/341.42, 278, 287, 470; 348/208.1–208.7, E05.031; 396/52
See application file for complete search history.

(56) References Cited

U.S. PATENT DOCUMENTS

| | | | | |
|---|---|---|---|---|
| 2007/0097516 A1* | 5/2007 | Ohtake | ................ | G02B 15/173 359/687 |
| 2009/0316010 A1* | 12/2009 | Nomura | ................... | G03B 5/00 348/208.6 |
| 2011/0128392 A1* | 6/2011 | Kumagai | ................ | G03B 5/00 348/208.5 |

* cited by examiner

OPTICAL APPARATUS, CONTROL METHOD THEREOF AND STORAGE MEDIUM

BACKGROUND OF THE INVENTION

Field of the Invention

The present invention relates to a technique of correcting the blur of a captured image by using a plurality of correction optical systems.

Description of the Related Art

Recently, an image blur correction function, which not only corrects the blur of a captured image caused by camera shake while the user is standing still but also corrects a relatively large blur caused when the user performs shooting with one hand and the large blur of a captured image caused when the user performs shooting while walking, has become widespread.

Image blur correction methods include techniques such as an optical image blur correction technique of shifting an optical axis in accordance with blur by optically moving a correction lens and an electronic image blur correction technique of changing a cutout region output from an image captured by an image sensor in accordance with blur.

In order to correct a large blur, an optical image blur correction scheme needs to increase a correction angle, whereas an electronic image blur correction scheme needs to set a large surplus pixel region. Either method needs to expand a correction range. When expanding a correction range, however, the optical image blur correction scheme suffers from a problem that a lens or an actuator increases in size or the optical performance deteriorates when the lens is greatly shaken. In addition, the electronic image blur correction scheme suffers from a problem that a reduction in an effective region leads to a deterioration in image quality and an increase in the size of an image sensor leads to an increase in power consumption.

In order to solve such problems, Japanese Patent Laid-Open No. 2003-202499 has proposed a method of providing and driving two correction optical systems for shake correction. In addition, Japanese Patent Laid-Open No. 2010-4370 has proposed a method which provides a correction optical system and an electronic correction system and corrects blur by separating it into a high frequency band and a low frequency band and performing correction for each frequency band using two correction systems.

The conventional techniques disclosed in Japanese Patent Laid-Open Nos. 2003-202499 and 2010-4370, however, give no consideration to control at the time of a zoom operation. For this reason, the following problem arises.

That is, when separating the frequency band of the shake and performing correction using the two correction optical systems, the movable ranges of the two correction optical systems change by an optical characteristic according to a focal length. For this reason, it is necessary to switch between the system in charge of correcting a high-frequency component and the system in charge of correcting a low-frequency component in accordance with the focal length in order to ensure a desired shake correction performance. However, if the switching between the system in charge of correcting the high-frequency component and the system in charge of correcting a low-frequency component is done during the zoom operation, a failure in image blur correction such as an end hit occurs along with a change in the movable ranges.

SUMMARY OF THE INVENTION

The present invention has been made in consideration of the above problem, and provides an image capturing apparatus which can obtain a good image blur correction effect even during the zoom operation.

According to the first aspect of the present invention, there is provided an optical apparatus comprising: a shake detection unit configured to detect a shake of the apparatus; a first optical correction unit configured to correct an image blur based on the shake detected by the shake detection unit; a second optical correction unit configured to correct an image blur based on the shake detected by the shake detection unit; a zoom detection unit configured to detect whether a zoom lens is performing a zoom operation; a correction amount calculation unit configured to calculate, based on the shake, correction amounts to be corrected by the first optical correction unit and the second optical correction unit; and a control unit configured to change a calculation method of the correction amounts calculated by the correction amount calculation unit according to whether the zoom lens performs the zoom operation or whether the zoom lens stops the zoom operation, wherein the control unit controls the correction amount calculation unit to calculate the correction amounts to be corrected by the first optical correction unit and the second optical correction unit by calculation of separating a frequency of the shake when the zoom operation is stopped, and to calculate the correction amounts to be corrected by the first optical correction unit and the second optical correction unit by proportional calculation based on movable ranges of the first optical correction unit and the second optical correction unit when the zoom operation is performed.

According to the second aspect of the present invention, there is provided a method of controlling an optical apparatus comprising a shake detection unit configured to detect a shake of the optical apparatus, a first optical correction unit configured to correct an image blur based on the shake detected by the shake detection unit, and a second optical correction unit configured to correct an image blur based on the shake detected by the shake detection unit, the method comprising: a zoom detection step of detecting whether a zoom lens is performing a zoom operation; a correction amount calculation step of calculating, based on the shake, correction amounts to be corrected by the first optical correction unit and the second optical correction unit; and a control step of changing a calculation method of the correction amounts calculated in the correction amount calculation step according to whether the zoom lens performs the zoom operation or whether the zoom lens stops the zoom operation, wherein in the control step, the correction amount calculation step is controlled to calculate the correction amounts to be corrected by the first optical correction unit and the second optical correction unit by calculation of separating a frequency of the shake when the zoom operation is stopped, and to calculate the correction amounts to be corrected by the first optical correction unit and the second optical correction unit by proportional calculation based on movable ranges of the first optical correction unit and the second optical correction unit when the zoom operation is performed.

Further features of the present invention will become apparent from the following description of exemplary embodiments with reference to the attached drawings.

DESCRIPTION OF THE EMBODIMENTS

An embodiment of the present invention will be described below in detail with reference to the accompanying drawings. In the following embodiment, a digital video camera will be described as one example of an image capturing apparatus of the present invention. However, the present invention is also applicable to an arbitrary image capturing apparatus having a moving image shooting function. The image capturing apparatus also includes a device in which an image capturing apparatus such as a cellular phone with a camera, a game machine or a personal computer is incorporated or integrated. Note that in the description of this embodiment, a vibration applied to the image capturing apparatus is expressed as a "shake" and an influence on a captured image caused by the shake applied to the image capturing apparatus is expressed as an "image blur".

Figure 1:
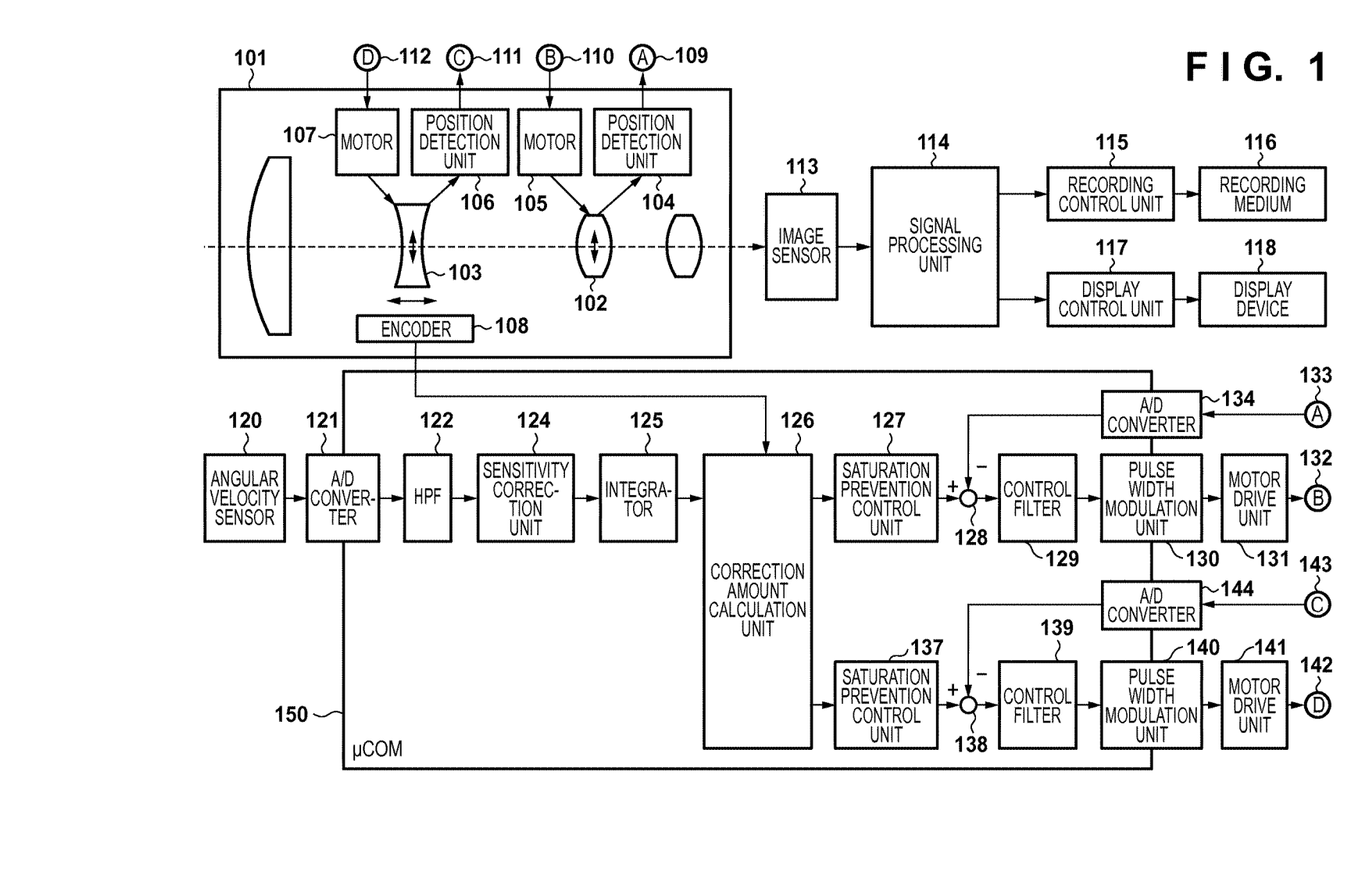
FIG. 1 is a block diagram showing the arrangement of an image capturing apparatus according to an embodiment of the present invention.

FIG. 1 is a block diagram showing an example of the arrangement of an image capturing apparatus according to the first embodiment of the present invention. Referring to FIG. 1, a shooting optical system 101 is a lens group constituted by a plurality of lenses. The shooting optical system 101 includes two optical image blur correction mechanisms. A shift lens (first optical correction unit) 102 is the first optical image blur correction mechanism, which can change the incident angle of a light beam entering an imaging plane by being moved within a two-dimensional plane perpendicular to the optical axis. A zoom lens (second optical correction unit) 103 is the second optical image blur correction mechanism. The zoom lens 103 changes the magnification of the shooting optical system 101 by being moved in the optical axis direction, and can change the magnification of an image formed on the imaging plane of the image sensor. In addition, the zoom lens 103 can move within the two-dimensional plane perpendicular to the optical axis or spherically rotate about one point on the optical axis, and also functions as the optical image blur correction mechanism. The shift lens 102 and the zoom lens 103 will also be referred to as the first correction optical system and the second correction optical system hereinafter, respectively.

An image sensor 113 photoelectrically converts an optical object image formed via the shooting optical system 101 and outputs the resultant signal as a video signal. For example, a CCD or CMOS sensor is used as the image sensor 113. A signal processing unit 114 is constituted by an analog signal processing circuit and a digital signal processing circuit. The analog signal processing circuit generates an analog imaging signal by performing predetermined processing on the signal obtained by the image sensor 113. For example, the analog signal processing circuit is constituted by a CDS (Correlated Double Sampling) circuit, an AGC (Automatic Gain Control) circuit, and the like. The digital signal processing circuit converts an analog imaging signal into a digital signal by using an A/D converter and generates a digital video signal by performing predetermined signal processing such as gamma correction or white balance correction. In addition, the digital signal processing circuit generates, for example, evaluation signals for AF (Auto Focus) control and AE (Auto Exposure) control.

A recording control unit 115 outputs a video signal supplied from the signal processing unit 114 to a recording medium 116 and makes it record the signal, when an instruction to record the video signal is issued by an operation unit (not shown) used to issue an instruction to start or end recording. The recording medium 116 is an information recording medium such as a semiconductor memory, a magnetic recording medium such as a hard disk or a magnetic tape, or the like. A display control unit 117 outputs the video signal supplied from the signal processing unit 114 and causes a display device 118 to display the image. The display device 118 displays an image by using, for example, a liquid crystal display element (an LCD or a viewfinder).

An angular velocity sensor 120 is a sensor for detecting the shake applied to the image capturing apparatus. For example, the angular velocity sensor 120 is formed from a vibration gyroscope or the like, which detects the angular velocity of the overall shake of the image capturing apparatus caused by camera shake or the like and outputs an electrical signal. The angular velocity sensor 120 arranges two angular velocity sensors in two axial directions, for example, a rotation axis (Yaw) in the horizontal direction and a rotation axis (Pitch) in the vertical direction, so as to form detection axes perpendicular to each other on one plane perpendicular to the optical axis. The angular velocity sensor 120 separately calculates correction amounts for the respective detected axes to control the first and second correction optical systems in the two axial directions in the horizontal and the vertical directions. Computation of correction amounts and control of the correction optical systems with respect to the rotation axis (Yaw) in the horizontal direction and the rotation axis (Pitch) in the vertical direction can be implemented by the same processing for the two axes. For this reason, the following description will be made about only one axis.

An A/D converter 121 converts the electrical signal output from the angular velocity sensor 120 into a digital signal and inputs it to a μCOM 150. The captured digital signal is supplied to an HPF (High-Pass Filter) 122 to cut off a low frequency component contained in a shake signal so as to output the high frequency component of the shake signal. Note that the purpose of the HPF 122 is to remove a noise component in the angular velocity sensor 120 and a drift component in a DC voltage generated by temperature characteristics or the like. However, this HPF is not an essential constituent element in this embodiment, and an output from the A/D converter 121 may be directly supplied to a sensitivity correction unit 124.

The sensitivity correction unit 124 amplifies the first separated shake signal so as to make it have an amplitude optimal for shake correction performed by the first correction optical system (that is, the shift lens 102). Note that amplification in this case includes amplification with a gain of ×1 or less. The first separated shake signal amplified by the sensitivity correction unit 124 is supplied to an integrator 125.

The shake signal detected by the angular velocity sensor 120 and the first and second separated shake signals generated by separating the shake signal are angular velocities. In contrast to this, control amounts for the shift lens 102 and the zoom lens 103 are angular displacements. It is therefore necessary to convert angular velocities into angular displacements by time integration. The integrator 125 performs an integration operation of the first separated shake signal and outputs the resultant signal. The integrator 125 performs imperfect integration and can arbitrarily change its time constant.

A correction amount calculation unit 126 changes a calculation method of the correction amount based on a determination result of the presence/absence of a zoom operation and calculates the control amounts of the first and second correction optical systems. Details will be described later. The saturation prevention control unit 127 limits the control amount generated by the correction amount calculation unit 126 so as to prevent the shift lens 102 from abutting against a mechanical movable end. According to an example of control, the value obtained by limiting an output from the correction amount calculation unit 126 is output as the final control amount (to be also referred to as a drive target position hereinafter) so as not to make a control amount for the first correction optical system exceed a predetermined amount (to be referred to as a limit value hereinafter). In addition, when an output from the correction amount calculation unit 126 approaches a limit value, the control amount is controlled to decrease with a lapse of time by reducing the time constant of the integrator 125. Note that since the sensitivity correction unit 124 amplifies a shake signal, an output from the saturation prevention control unit 127 becomes a control amount suitable for shake correction by using the first correction optical system.

The block for controlling the drive of the first correction optical system (shift lens 102) will be described next.

An A/D converter 134 performs A/D conversion on an output signal from a position detection unit 104, which detects the position of the shift lens 102, into a digital signal. A subtractor 128 then subtracts the digital data from a drive target position as an output from the saturation prevention control unit 127. Deviation data as the result is supplied to a control filter 129. In this case, a terminal A 109 and a terminal A 133 are electrically connected to each other.

The control filter 129 is constituted by an amplifier which amplifies input data with a predetermined gain and a phase compensation filter. In the control filter 129, the amplifier and the phase compensation filter perform signal processing on the deviation data supplied from the subtractor 128. The resultant data is output to a pulse width modulation unit 130.

The pulse width modulation unit 130 modulates digital data supplied via the control filter 129 into waveform (that is, a PWM waveform) by changing the duty ratio of the pulse wave, and supplies the modulated data to a motor drive unit 131. A motor 105 is a voice coil motor for driving the shift lens 102. When the motor 105 is driven by the motor drive unit 131, the first correction optical system 102 is moved in a direction perpendicular to the optical axis. In this case, a terminal B 110 and a terminal B 132 are electrically connected to each other.

The position detection unit 104 is constituted by a magnet and a Hall sensor mounted at a position facing the magnet. The position detection unit 104 detects the movement amount of the shift lens 102 in a direction perpendicular to the optical axis, and supplies the detection result to the subtractor 128 described above via the A/D converter 134. This forms a feedback control system which makes the position of the shift lens 102 in the direction perpendicular to the optical axis follow a drive target position which is an output from the saturation prevention control unit 127.

A block which controls the driving of the second correction optical system (zoom lens 103) will be described next.

An A/D converter 144 performs A/D conversion on an output signal from a position detection unit 106, which detects the position of the zoom lens 103, into a digital signal. A subtractor 138 then subtracts the digital data from a drive target position as an output from a saturation prevention control unit 137. Deviation data as the result is supplied to a control filter 139. In this case, a terminal C 111 and a terminal C 143 are electrically connected to each other.

The control filter 139 is constituted by an amplifier which amplifies input data with a predetermined gain and a phase compensation filter. In the control filter 139, the amplifier and the phase compensation filter perform signal processing on the deviation data supplied from the subtractor 138. The resultant data is output to a pulse width modulation unit 140.

The pulse width modulation unit 140 modulates digital data supplied via the control filter 139 into waveform (that is, a PWM waveform) by changing the duty ratio of the pulse wave, and supplies the modulated data to a motor drive unit 141. A motor 107 is a voice coil motor for driving the zoom lens 103. When the motor 107 is driven by the motor drive unit 141, the zoom lens 103 is moved in a direction perpendicular to the optical axis. In this case, a terminal D 112 and a terminal D 142 are electrically connected to each other.

The position detection unit 106 is constituted by a magnet and a Hall sensor mounted at a position facing the magnet. The position detection unit 106 detects the movement amount of the zoom lens 103 in a direction perpendicular to the optical axis, and supplies the detection result to the subtractor 138 described above via the A/D converter 144. This forms a feedback control system which makes the position of the zoom lens 103 in the direction perpendicular to the optical axis follow a drive target position which is an output from the saturation prevention control unit 137.

The image blur caused by the shake applied to the image capturing apparatus can be corrected by driving the correction optical system based on the shake signal detected by the angular velocity sensor 120 in this manner.

Figure 4:
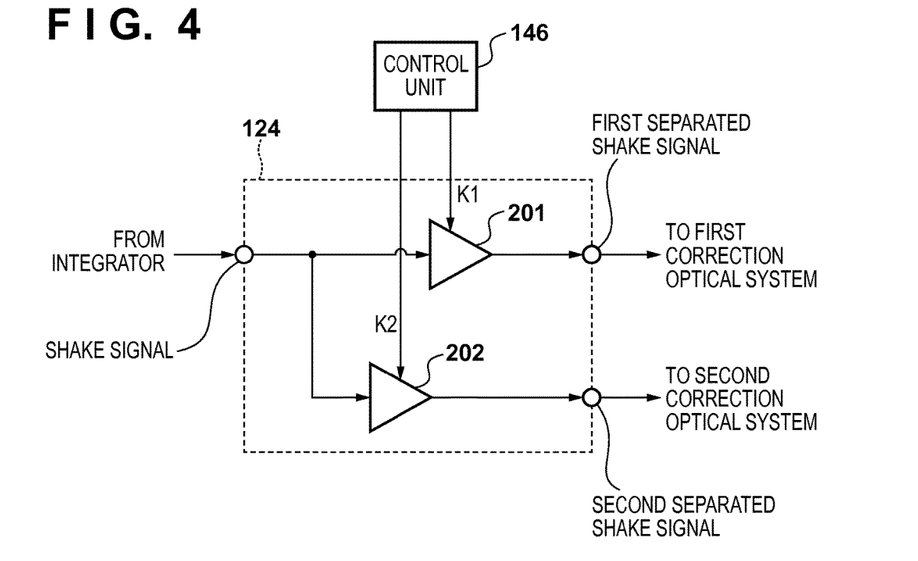
FIG. 4 is a diagram showing an example of the correction amount calculation unit at the time of a zoom operation.

The correction amount calculation unit 126 will be described next. The correction amount calculation unit 126 acquires a zoom position (the position information of the zoom lens 103) from the encoder 108 and determines whether the zoom operation is in progress (zoom detection) by calculating a time change. The correction amount calculation unit 126 changes the calculation method of the correction amount in accordance with the determination result of whether the zoom operation is in progress. The calculation method at the time of change is performed by arrangements as shown in FIGS. 2 and 4.

Figure 2:
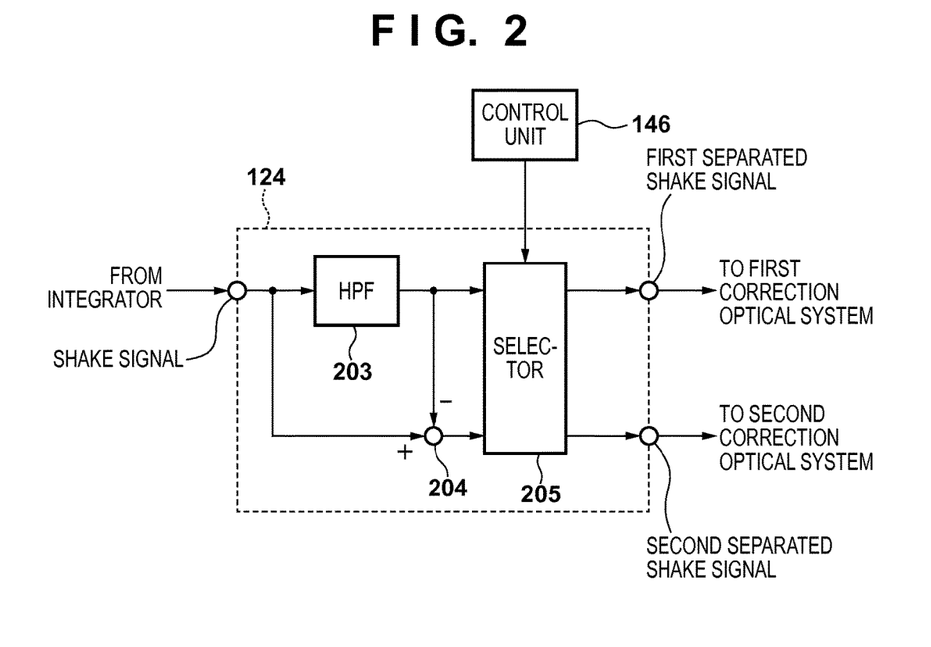
FIG. 2 is a diagram showing an example of a correction amount calculation unit at the time of zoom stop.

FIG. 2 shows an example of the arrangement of the correction amount calculation unit at the time of zoom stop. Referring to FIG. 2, the two correction optical systems are controlled by separating the shake signal detected by the angular velocity sensor into different frequency bands, and outputting two shake signals having a high frequency component and a low frequency component. It is possible to switch, in accordance with a signal supplied from a control unit 146, that the high frequency component and the low frequency component are output to one of the first and second separated shake signals.

Referring to FIG. 2, an HPF 203 extracts only a signal having a high-frequency component out of the shake signal detected by the angular velocity sensor 120, and the extracted signal is supplied to a selector 205 and a subtraction unit 204. The subtraction unit 204 subtracts the high frequency component having passed through the HPF 203 from an original shake signal to generate a low-frequency component contained in the shake signal and outputs it to the selector 205. This arrangement makes a high-frequency shake signal complementary to a low-frequency shake signal. This makes it possible to completely correct the frequency band of the original shake signal even when performing correction by using the two correction optical systems. Note that an LPF may be used in place of the HPF 203 to pass a low frequency component, which is output as one output, and to subtract it from the original signal to generate a high frequency component, which is output as the other output.

The selector 205 can switch, in accordance with a control signal from the control unit 146, between whether to perform output with a combination of the high frequency component to the first separated shake signal and the low frequency component to the second separated shake signal or with a combination of the low frequency component to the first separated shake signal and the high frequency component to the second separated shake signal. In this manner, it is possible to separate the shake signal into the high frequency component and the low frequency component, and switch its output destination to the first correction optical system or the second correction optical system.

Figure 3:
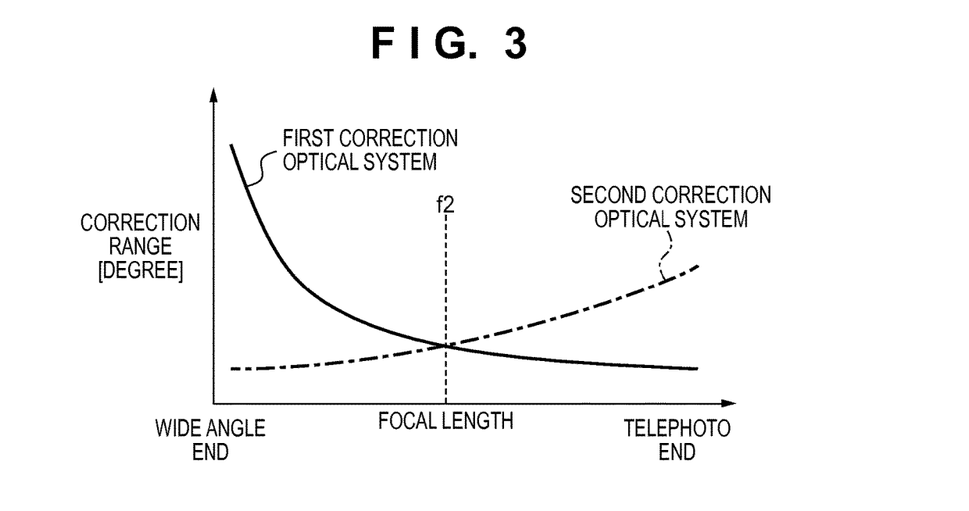
FIG. 3 is a graph showing the movable ranges of the first and second correction optical systems.

FIG. 3 is a graph showing the correction range (unit: degree) of the first and second correction optical systems by a focal length in consideration of optical constraints. Referring to FIG. 3, a focal length at which the correction range of the first correction optical system and that of the second correction optical system cross each other is defined as f2. The control unit 146 controls a signal distribution unit to assign the low frequency component to the first correction optical system in the range where the focal length is smaller than f2 and assign the low frequency component to the second correction optical system in the range where the focal length is f2 or larger.

FIG. 4 shows an example of the arrangement of the correction amount calculation unit at the time of a zoom operation. Referring to FIG. 4, a multiplier 201 amplifies the shake signal detected by the angular velocity sensor 120 by a predetermined magnification K1 and outputs the resultant signal as the first separated shake signal. Also, a multiplier 202 amplifies the shake signal by a predetermined magnification K2 and outputs the resultant signal as the second separated shake signal. The first separated shake signal and the second separated shake signal are separated such that the separated signals are complementary to each other. Therefore, it is possible to perform accurate correction even when performing image blur correction using the two correction optical systems by setting a magnification to be:

$0 \leq K1 \leq 1$ $K2 = 1 - K1$.

K1 and K2 are set by the control unit 146. More specifically, during the zoom operation, the amplitude of the shake detected by the angular velocity sensor 120 is divided based on the proportion of the movable ranges of the first and second correction optical systems, and the divided amplitude amounts are set to their correction amounts, respectively.

Figure 5:
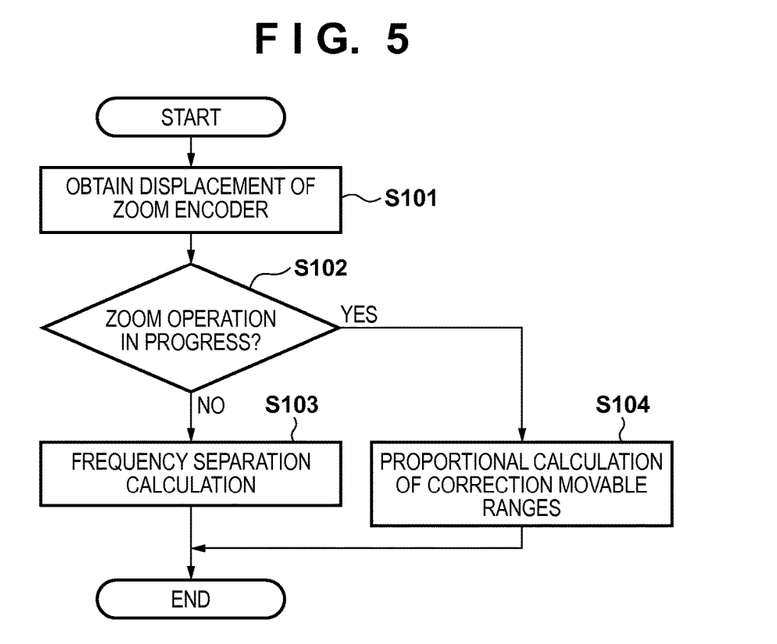
FIG. 5 is a flowchart for explaining correction amount calculation control.

An example of the control operation of the correction amount calculation unit will now be described with reference to the flowchart shown in FIG. 5. Note that the processing shown in FIG. 5 is repeatedly executed in an arbitrary predetermined cycle such as 60 Hz, which is a cycle in which the image capturing apparatus captures a one-frame image.

In step S101, the correction amount calculation unit obtains the displacement of the zoom encoder 108. Then, in step S102, the correction amount calculation unit determines whether the zoom operation is in progress. If the zoom operation is not in progress, the process advances to step S103. If the zoom operation is in progress, the process advances to step S104. Then, in step S103, the correction amount calculation unit performs frequency separation calculation in correction amount calculation. In step S104, the correction amount calculation unit performs proportional calculation of correction movable ranges in correction amount calculation.

As described above, during zoom stop, the system disclosed in this embodiment separates the frequency band, and performs correction for each image blur component in the high frequency band and the low frequency band by using the two correction optical systems. On the other hand, during the zoom operation, the system performs correction in accordance with the proportional calculation corresponding to the correction movable ranges of the two correction optical systems. This makes it possible to secure the correction range irrespective of the frequency band even if the movable ranges change during the zoom operation and implement good image blur correction while zooming.

Although in this embodiment, the angular displacement amount of each correction optical system is calculated by detecting the angular velocity of shake using the angular velocity sensor and performing integration processing on the detected angular velocity, other shake detection unit may be used. For example, the embodiment may be configured to calculate the angular displacement amount of each correction optical system by detecting the acceleration of shake using an acceleration sensor and performing integration on the detected acceleration twice.

In addition, although this embodiment has exemplified the method of correcting the image blur of a captured image by moving some of the lens groups of the shooting optical system, each as an example of a correction optical system, within a two-dimensional plane perpendicular to the optical axis, the present invention is not limited to this. For example, each correction optical system may be configured to spherically rotate about one point on the optical axis, or, for example, a method of driving a VAP (Variable Angle Prism) or the image sensor in a direction perpendicular to the optical axis may be used. Alternatively, a plurality of schemes may be combined.

Furthermore, although this embodiment has exemplified the method of performing image blur correction by using the two correction optical systems upon separating a shake signal into two signals, the present invention is not limited to this. The present invention also incorporates a form in which, for example, a shake signal may be separated into three or more signals, and three or more correction optical systems may be driven to perform image blur correction.

Although the present invention has been described in detail above based on its preferred embodiments, the present invention is not limited to these specific embodiments. The present invention also incorporates various forms without departing from the scope of the invention. Some features of the above embodiments may be combined as needed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-089559, filed Apr. 23, 2014, which is hereby incorporated by reference herein in its entirety.

What is claimed is:

1. An optical apparatus comprising:
a first optical correction device configured to correct an image blur caused by a shake of the apparatus;
a second optical correction device configured to correct the image blur caused by the shake of the apparatus, wherein said second optical correction device is different from said first optical correction device;
a processor; and
a memory storing executable software which, when executed by the processor, causes the processor to function as:
a zoom detection unit configured to detect whether a zoom operation of a zoom lens is in progress or not, wherein a zoom magnification optically varies in the zoom operation;
a correction amount calculation unit configured to calculate correction amounts to be used by said first optical correction device and said second optical correction device; and
a control unit configured to change a calculation method of the correction amounts calculated by said correction amount calculation unit according to whether the zoom operation is in progress or not,
wherein said control unit controls said correction amount calculation unit to calculate the correction amounts to be used by said first optical correction device and said second optical correction device by calculation of separating a frequency of the shake of the apparatus when the zoom operation is stopped, and to calculate the correction amounts to be used by said first optical correction device and said second optical correction device by proportional calculation based on movable ranges of said first optical correction device and said second optical correction device when the zoom operation is in progress.

2. The apparatus according to claim 1, wherein said correction amount calculation unit calculates the correction amounts to be used by said first optical correction device and said second optical correction device based on the shake of the apparatus.

3. The apparatus according to claim 2, wherein the executable software, when executed by the processor, further causes the processor to function as:
a shake detection unit configured to detect the shake of the apparatus.

4. The apparatus according to claim 2, wherein when the zoom operation is stopped, said correction amount calculation unit sets the low-frequency component to the correction amount to be used by an optical correction device having a larger movable range out of said first optical correction device and said second optical correction device.

5. The apparatus according to claim 1, wherein
said first optical correction device corrects the image blur by using a first correction device, and
said second optical correction device corrects the image blur by using a second correction device which is different from the first correction device.

6. The apparatus according to claim 1, wherein when the zoom operation is stopped, said correction amount calculation unit separates the shake of the apparatus into a high-frequency component and a low-frequency component, and sets one of the high-frequency component and the low-frequency component to the correction amount to be used by one of said first optical correction device and said second optical correction device.

7. The apparatus according to claim 1, wherein when the zoom operation is in progress, said correction amount calculation unit divides an amplitude of the shake of the apparatus based on a proportion of the movable ranges of said first optical correction device and said second optical correction device, and sets divided amplitude amounts to the correction amounts to be used by said first optical correction device and said second optical correction device.

8. A method of controlling an optical apparatus comprising a first optical correction device configured to correct an image blur caused by a shake of the apparatus, a second optical correction device configured to correct the image blur caused by the shake of the apparatus, wherein said second optical correction device is different from said first optical correction device, a processor, and a memory storing executable software which, when executed by the processor, causes the processor to perform:
a zoom detection step of detecting whether a zoom operation of a zoom lens is in progress or not, wherein a zoom magnification optically varies in the zoom operation;
a correction amount calculation step of calculating correction amounts to be used by the first optical correction device and the second optical correction device; and
a control step of changing a calculation method of the correction amounts calculated in the correction amount calculation step according to whether the zoom operation is in progress or not,
wherein in said control step, the processor controls to calculate the correction amounts to be used by said first optical correction device and said second optical correction device by calculation of separating a frequency of the shake of the apparatus when the zoom operation is stopped, and to calculate the correction amounts to be used by said first optical correction device and said second optical correction device by proportional calculation based on movable ranges of said first optical correction device and said second optical correction device when the zoom operation is in progress.

9. A non-transitory computer readable storage medium storing a program, which when executed, causes a computer to perform a method of controlling an optical apparatus comprising a first optical correction device configured to correct an image blur caused by a shake of the apparatus and a second optical correction device configured to correct the image blur caused by the shake of the apparatus, wherein said second optical correction device is different from said first optical correction device, the method comprising:

a zoom detection step of detecting whether a zoom operation of a zoom lens is in progress or not, wherein a zoom magnification optically varies in the zoom operation;

a correction amount calculation step of calculating correction amounts to be used by the first optical correction device and the second optical correction device; and a control step of changing a calculation method of the correction amounts calculated in the correction amount calculation step according to whether the zoom operation is in progress or not, wherein in said control step, the computer controls to calculate the correction amounts to be used by said first optical correction device and said second optical correction device by calculation of separating a frequency of the shake of the apparatus when the zoom operation is stopped, and to calculate the correction amounts to be used by said first optical correction device and said second optical correction device by proportional calculation based on movable ranges of said first optical correction device and said second optical correction device when the zoom operation is in progress.

* * * * *